US008302861B2

(12) United States Patent
Siotia et al.

(10) Patent No.: US 8,302,861 B2
(45) Date of Patent: Nov. 6, 2012

(54) SYSTEM AND METHOD FOR MAINTAINING INVENTORY MANAGEMENT RECORDS BASED ON DEMAND

(75) Inventors: Sanjeev Siotia, South Borough, MA (US); Nitin Kapoor, Somerville, MA (US); Suresh K. Damodaran, Acton, MA (US)

(73) Assignee: IBM International Group B.V., Amsterdam (NL)

( * ) Notice: Subject to any disclaimer, the term of this patent is extended or adjusted under 35 U.S.C. 154(b) by 590 days.

(21) Appl. No.: 11/752,140

(22) Filed: May 22, 2007

(65) Prior Publication Data

US 2008/0290162 A1    Nov. 27, 2008

(51) Int. Cl.
*G06K 15/00* (2006.01)
(52) U.S. Cl. ...................................................... 235/383
(58) Field of Classification Search .................... 235/383
See application file for complete search history.

(56) References Cited

U.S. PATENT DOCUMENTS

| | | | |
|---|---|---|---|
| 5,195,041 A * | 3/1993 | George et al. ................. 700/100 |
| 6,219,751 B1 * | 4/2001 | Hodges ........................ 711/114 |
| 6,604,089 B1 | 8/2003 | Van Horn et al. |
| 6,631,356 B1 | 10/2003 | Van Horn et al. |
| 6,901,430 B1 | 5/2005 | Smith |
| 6,904,410 B1 | 6/2005 | Weiss et al. |
| 7,120,592 B1 | 10/2006 | Lewis |
| 7,124,098 B2 | 10/2006 | Hopson et al. |
| 2002/0099631 A1 * | 7/2002 | Vanker et al. .................. 705/28 |
| 2002/0191692 A1 * | 12/2002 | Fallon et al. .................. 375/240 |
| 2003/0074390 A1 * | 4/2003 | Hudson ........................ 709/108 |
| 2004/0054751 A1 * | 3/2004 | Weissert et al. ............... 709/217 |
| 2004/0117531 A1 * | 6/2004 | McKenney .................... 710/200 |
| 2008/0162297 A1 * | 7/2008 | Hershkovitz et al. ........... 705/26 |

* cited by examiner

*Primary Examiner* — Daniel Hess
*Assistant Examiner* — David Tardif
(74) *Attorney, Agent, or Firm* — Jackson Walker L.L.P.; Joseph P. Lally

(57) ABSTRACT

A computer implemented system and method for managing inventory includes determining a value for a parameter indicative of a response time associated with at least one transaction for an item of inventory. In conjunction with executing any particular transaction, an inventory update method is selected from a plurality of inventory update methods based at least in part on the determined value. A record indicative of an inventory level of the item is modified according to the selected inventory update method. A first inventory update method alters a locked inventory record and a second inventory update method alters a freely accessible proxy for the locked inventory record.

16 Claims, 3 Drawing Sheets

SYSTEM AND METHOD FOR MAINTAINING INVENTORY MANAGEMENT RECORDS BASED ON DEMAND

FIELD OF THE DISCLOSURE

The present disclosure relates generally to inventory management.

BACKGROUND OF THE DISCLOSURE

Inventory management may include electronically updating a database record that indicates the available inventory for a specific item when a transaction is processed. Updating a database record, also referred to herein as an inventory record, may include "locking" the inventory record, reducing the inventory count in the record by the items associated with the transaction, and then unlocking the inventory record so that another application, process, or thread can access it. This technique works well when the number of orders waiting for the specific inventory record is small enough that the lock/unlock process doesn't add much to the order response time. However, when the number of orders for a specific item is large, the repetitive locking and unlocking of an inventory record may cause unacceptable slow response times from the perspective of the consumer or other transaction client.

DETAILED DESCRIPTION OF THE DRAWINGS

In one aspect, a data processing system suitable for use in an inventory management environment is disclosed. The disclosed system includes a processor and a memory accessible to the processor. The disclosed system includes a module, all or a part of which may be implemented as computer executable instructions stored in the memory, to monitor transactions that alter inventory of an item. The module is able to change an inventory status of the item based on a characteristic of said transactions. For example, the inventory status may depend at least in part on a response time associated with the transactions. The system further includes a transaction processor. The transaction processor alters the inventory of an item in response to a transaction associated with the item. The transaction processor alters the inventory using a first technique when the inventory has a first status and according to a second technique when the inventory has a second status. For example, the first technique may be a relatively fast technique that is used when the first status corresponds to high demand and the second technique may be a relatively slow, but safer, technique used when the second status corresponds to a lower level of demand.

In another aspect, a computer program embedded in a computer-readable medium is disclosed and includes instructions to determine transaction times for transactions associated with an item of inventory and to select an inventory update method based at least in part on the transaction times. For example, a fast inventory update method may be selected when the transactions times exceed a threshold while a slower, but more reliable, inventory updated method may be selected when the transaction times exceed the threshold.

In another aspect, a method of managing inventory is disclosed. The method includes calculating a value for a parameter that reflects a response time associated with transactions for an item of inventory. In response to a transaction for the item of inventory, the disclosed modifies an inventory record that indicates a level inventory of the item based on one of at least two inventory update methods. For example, a first method updates a locked inventory record directly while a second method updates a proxy for the locked inventory record.

Figure 1:
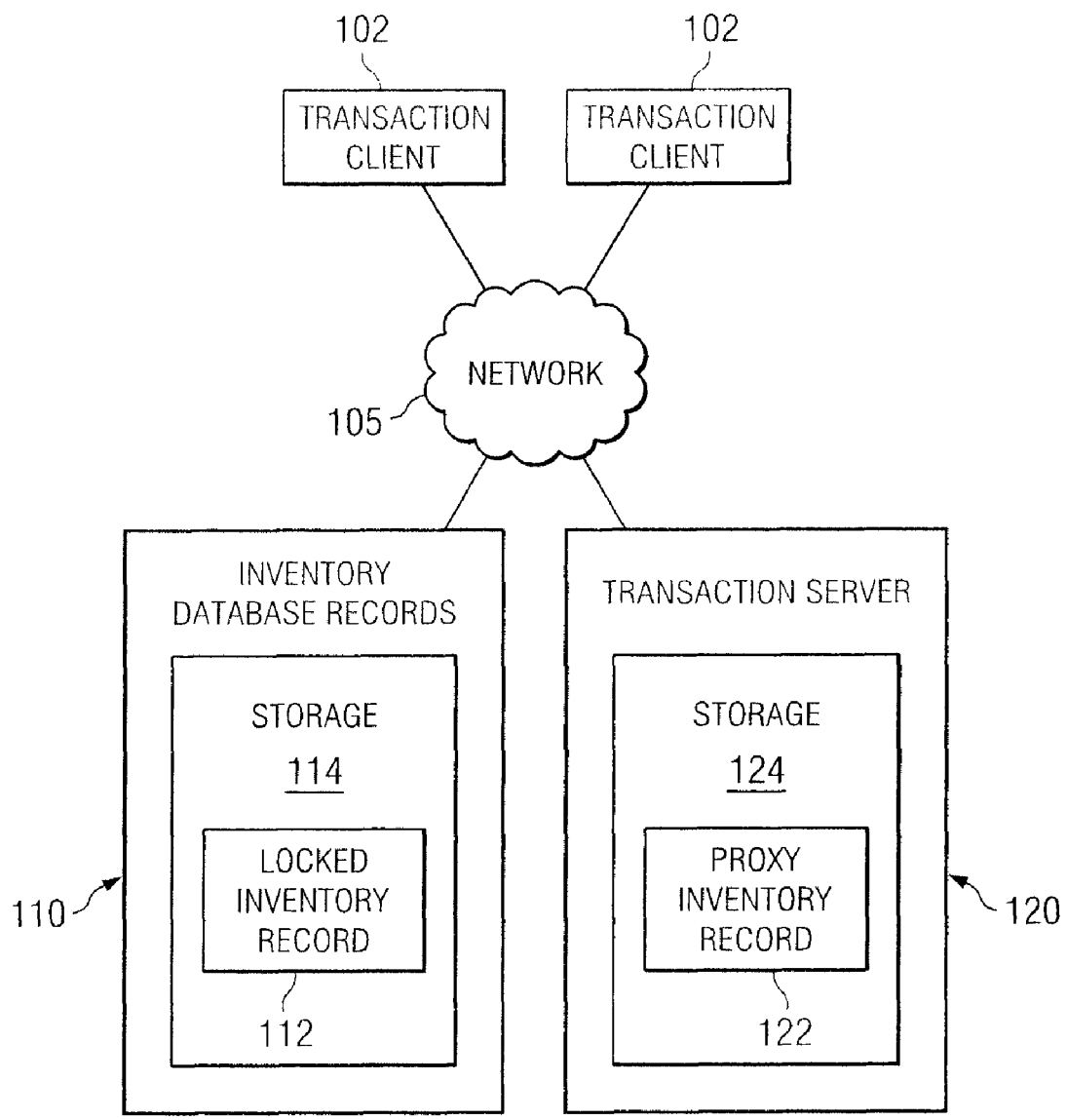
FIG. 1 is a block diagram illustrating an embodiment of a transaction processing environment.

Referring to FIG. 1, selected elements of an exemplary embodiment of an inventory management environment 100 are depicted. The inventory management environment 100 as depicted includes one or more transaction clients 102, an inventory database 110, and a transaction server 120 all of which are interconnected via a network 105. Transaction clients 102 represent resources capable of initiating transactions for an item of inventory that is managed by transaction server 120, inventory database 110, or a combination thereof. An exemplary embodiment of a suitable transaction client 102 is a web browser executing on a client data processing system (not explicitly depicted). The client data processing system could be a desktop computer, a laptop computer, a tablet computer, a personal digital assistant (PDA), or any of a number of other network-aware devices and systems.

Network 105 as shown represents any suitable medium or combination of media for interconnecting the depicted resources. In some embodiments, network 105 includes wide area networks such as the Internet. Network 105 may also include a local area network and appropriate hardware including gateways, firewalls, routers, and the like. Network 105 as depicted encompasses wireless and wired physical media as well as various network protocols including the TCP/IP suite of protocols.

Inventory database 110 as depicted includes storage 114 containing at least one inventory record 112. In some embodiments, inventory record 112 is indicative of a level or quantity of inventory of a particular good. Inventory database 110 may include many such inventory records for many items of inventory. In addition, inventory database 110 may include information in addition to inventory records indicating levels of inventory. Storage 114 may include volatile storage such as dynamic or static memory devices, persistent or nonvolatile storage such as magnetic hard disks, optical media including compact discs (CD's), digital versatile discs (DVD's), flash memory devices, and other suitable persistent storage devices. As depicted in FIG. 1, inventory database 110 resides remotely from transaction server 120, and from transaction clients 112, and is accessible to transaction server 120 via network 105. In such embodiments, inventory database 110 may be implemented as a network attached storage (NAS) device, a storage area network (SAN), or any other suitable solution for providing network attached data. Although FIG. 1 illustrates inventory database 110 as remote from transaction server 120, other embodiments of environment 100 may incorporate or integrate inventory database 110 into transaction server 120.

As suggested previously, the described embodiment of inventory record 112 represents one or more values that indicate an inventory level associated with an item of inventory. The inventory record as it resides in the depicted embodiment of inventory database 110 is a limited access or "locked" record. A locked record, as suggested by its name, represents a record that includes a formal access mechanism designed at least in part to prevent multiple threads from accessing the record simultaneously and possibly also to prevent unauthorized access to the record. Locked records are desirable for data, such as inventory record 112, that is of significant importance with respect to an entity trying to conduct sales transactions. In the absence of accurate inventory records, a seller would find it difficult to commit to sales transactions.

Locked records such as the preferred implementations of inventory record 112 generally have longer effective access times than records or data that are not locked. This is especially true when a database containing a locked record resides remotely from the server that is attempting to gain access to the record. In an implementation such as the one depicted in FIG. 1, for example, the effective access time for transaction server 120 to access a locked inventory record such as inventor record 112 may be on the order of milliseconds or greater where the effective access represents the response time perceived from the perspective of transaction server 120 or from a transaction client 102.

The relatively longer effective access times associated with inventory record 112 may be acceptable under certain operating or environment conditions while it is probably not acceptable under certain other situations. If, for example, there is little or only moderate demand for the product to which inventory record 112 pertains, the milliseconds of effective access associated with inventor record 112 time might not present a problem for the users of transaction clients 102. If, on the other hand, demand for a particular good or service escalates to an extent that requires a queuing of orders, the amount of access time overhead associated with a locked record could lead to an unacceptable response time from the perspective of transaction clients 112.

Generally disclosed herein are a method, system, and media for taking action when the response time associated with a good or service exceeds an acceptable threshold. In the described embodiments, the inventory level for the good or service experiencing strong demand is nominally maintained as a locked or limited access record in an inventory database. Orders that alter the inventory of a particular item are monitored. If a response time associated with an item of inventory increases to the point that the response time exceeds a specified threshold, a disclosed method responds to the unacceptably large response time by allocating a proxy for the inventory record and using the proxy inventory record to record transactions. Preferably, the inventory record is local to the transaction server and is not a limited access or locked record. In these embodiments, the effective access time to access the proxy inventory records is substantially less than the effective access time to access the locked inventory record. By using the more readily accessible inventory record, a disclosed method of processing transactions is better able to maintain the client-perceived response time below an acceptable threshold. The disclosed method may encompass a transition to a subsequent state in which transactions are again processed via the locked inventory record. Such a transition could occur, for example, if demand for the product subsided or if a particular transaction generated an exception, e.g., if the number of units was exceptionally and unexpectedly large. The disclosed method also contemplates a return to locked record processing, i.e., a return to a state in which transactions are processed by accessing the locked inventory record as opposed to the proxy inventory record, when the inventory reaches a critical level. Regardless of the implementation details, the disclosed method embraces the concept of processing transactions for an item by modifying a limited access or locked record under some circumstances and processing transactions for the same item by modifying a freely accessible proxy of the limited access record under other circumstances.

Returning to FIG. 1, the depicted example of transaction server 120 includes a proxy inventory record 122 in a storage resource 124 of the transaction server. Whereas locked inventory record 112 suggests relatively slow and complex access, proxy inventory record 122 preferably represents a freely accessible storage record and, still more preferably, a storage record that is local to transaction server 120. In some embodiments, the relatively fast and simple access represented by proxy inventory record 122 is utilized when demand for a corresponding item of inventory results in unacceptable response times when transaction processing is limited to using locked inventory record 112 exclusively. Storage resource 124 encompasses various types of storage media including volatile memory devices, persistent storage such as hard disks, flash memory, and optical media, or a combination thereof.

Figure 2:
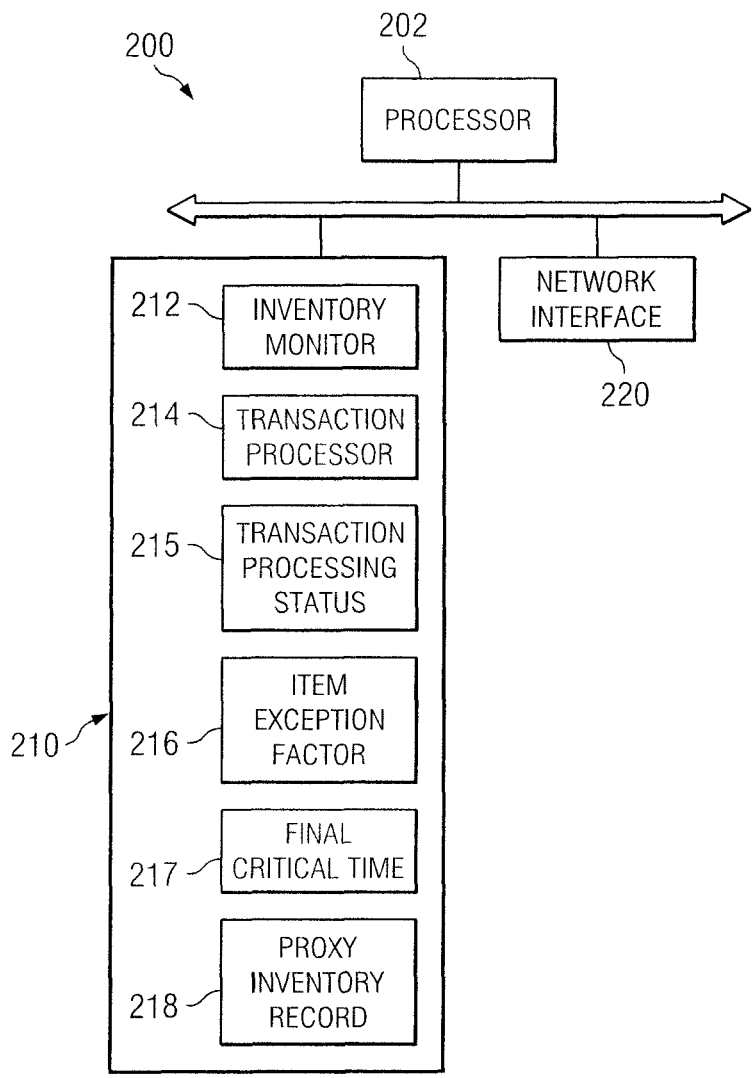
FIG. 2 is a block diagram illustrating an embodiment of a transaction server.

Before describing disclosed methods of inventory management and transaction processing, selected elements of an exemplary implementation of transaction server 120 are described. Referring to FIG. 2, the illustrated example of a general computer system 200 that serves as transaction server 120 includes a processor 202 connected to a storage resource 210 and a network interface 220. Processor 202 may be a commercially distributed general purpose central processing unit (CPU) such as an x86 type processor from Intel, AMD, or another. In other embodiments, processor 202 is an embedded processor or microcontroller while in still other embodiments, processor 202 is implemented with programmable logic or an application specific integrated circuit (ASIC).

Network interface 220 facilitates communication between processor 202 and other devices connected to network 105 (shown in FIG. 1). A conventional network interface card (NIC), for example, is an example of a resource suitable for use as network interface 220. Storage resource 210, in some embodiments, represents storage resource 124 as shown in FIG. 1 and, in these embodiments, includes a storage resource that serves as proxy inventory record 122 of FIG. 1. As shown in FIG. 2, for example, storage resource 210 includes proxy inventory record 218. In addition, the depicted example of storage resource 210 includes various software modules and variables suitable for use with some embodiments of the transaction processing methods described herein. For example, storage resource 210 as shown includes an inventory monitor 212 and a transaction processor 214. In some embodiments, inventory monitor 212 is enabled to track the level of inventory associated with one or more items of inventory while transaction processor 214 is responsible for executing a transaction, e.g., a purchase by a consumer, that changes the level of inventory. Inventory monitor 212 may include the ability to determine the transaction velocity or the rate at which inventory levels of a particular item of inventory are changing. Some embodiments of inventory monitor 212 may further include the ability to respond to detected changes in transaction velocity and inventory levels by altering the inventory status of a particular item.

Figure 3:
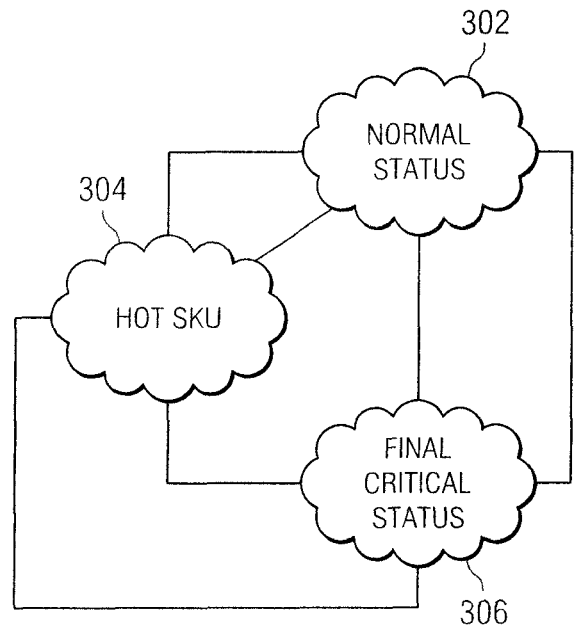
FIG. 3 is a conceptual diagram illustrating an embodiment of inventory states.

Referring to FIG. 3, for example, an exemplary and conceptual depiction of inventory states implemented in one embodiment of the transaction processing methods described herein is illustrated. As depicted in FIG. 3, an item of inventory may assume any of multiple inventory states. The inventory states represented in FIG. 3 include a nominal or normal state 302, a status 304 referred to as Hot SKU status, and a third status 306 referred to as Final Critical status. The interconnections among the inventory states convey that the inventory state may change from any state to any other state although, in practice, certain state transitions are less likely than others.

The normal status 302 as depicted in FIG. 3 encompasses a state in which the demand is relatively normal or low and the inventory levels are sufficient to last for a specified duration or longer. Under these conditions, "normal" transaction processing occurs. In some embodiments, normal transaction processing includes altering the inventory record in response to a transaction by altering the locked inventory record 112 depicted in FIG. 1. Although potential problems associated with using locked inventory record 112 have been describe above, the increased access time associated with locked inventory record 112 is not sufficiently large to produce unacceptable response times when demand is at or below a particular volume.

IF demand increases sufficiently for an item of inventory, the response times associated with processing each transaction through locked inventory record 112 may result in unacceptable long response times. Transaction server 120 preferably includes sufficient functionality in transaction processor 214, inventory monitor 212, and other resources to determine when response times for transaction requests exceed an acceptable level. When the demand for a particular item of inventory reaches such a level, the item of inventory is referred to herein as a hot item or a hot stock keeping unit (SKU) and the transaction processor 120 may change the inventory state of the item to the Hot SKU state 304 depicted in FIG. 3. In some embodiments, processing of transactions of Hot SKU items proceeds through a proxy inventory record such as the proxy inventory record 122 depicted in FIG. 1. The proxy inventory record 122 may be a local and freely accessible record that does not employ a lock/unlock access mechanism.

The Final Critical inventory state 306 as depicted in FIG. 3 represents an inventory state in which the demand is sufficient to classify the item of inventory as a Hot SKU, but the level of inventory is critically low. The inventory level that represents this critically low level may be defined in terms of how long transactions can be processed given the current level of inventory. A predetermined duration may be specified for this purpose, e.g., the final critical state may be entered when there is less than 15 minutes of inventory left based on current transaction volume and inventory levels. In some embodiments, transaction processing reverts back to processing through the locked inventory record when the inventory level for a Hot SKU reaches the critical level. If inventory is added and/or the volume of transactions, i.e., level of demand, levels off or decreases, the inventory state may change from Final Critical to HOT SKU or to normal. Similarly, inventory state may transition from Hot SKU to normal when demand drops.

Returning to FIG. 2, selected variables or parameters associated with the described transaction processing techniques are shown. These parameters include a transaction processing status parameter 215, an item exception factor 216, and a final critical time 217. Transaction processing state parameter assumes or is assigned a value that reflects the inventory status for an item of inventory whether the inventory status is normal, Hot SKU, or Final Critical according to the transaction status definitions illustrated in FIG. 3 or any other transaction status that may be defined or employed in other implementations. Item Exception factor 216 is a parameter that may be used to override the default transaction processing method for any given status. As an example, item exception factor 216 may be used to force transaction processing through locked inventory record 112 even when the transaction status for the applicable item of inventory is Hot SKU.

Such exceptions may occur, for example, if an usually large order is processed. Final Critical Time parameter 217 as shown in FIG. 3 represents the amount of time that defines the transition from a transaction processing status, e.g., Hot SKU, in which transaction processing is via proxy inventory record 122, to a transaction processing status, e.g., Final Critical, in which processing occurs through locked inventory record 112.

Final Critical time 217 and Item Exception factor may be determined by or influenced by historical transaction information. Item Exception factor 216, for example, may reflect the number of items of inventory requested, on average, for a given transaction request. This value may be determined from historical transaction processing and may change dynamically as additional transaction data is received. Final Critical time 217 may be determined dynamically based on the transaction volume, the average number of items per transaction, and the current inventory. Using these variables, one could estimate how long it will take to fully deplete the current level of inventory at the current level of demand. If the "time to zero inventory" falls below the Final Critical Time specified, transaction server 120 may impose the Final Critical transaction status and force transaction processing to occur via locked inventory record 112.

Referring back to FIG. 2, an illustrative embodiment of a general computer system that servers as the transaction server is shown and is designated 200. The computer system 200, or any portion thereof, may operate as a standalone device or may be connected, e.g., using a network, to other computer systems or peripheral devices. Computer system 200 can include a set of instructions that can be executed to cause the computer system 200 to perform one or more methods or computer based functions disclosed herein. The instructions are stored on a computer readable medium such as storage resource 210. Thus, some embodiments of transaction processing described herein are implemented as the instructions stored on the computer readable medium.

Figure 4:
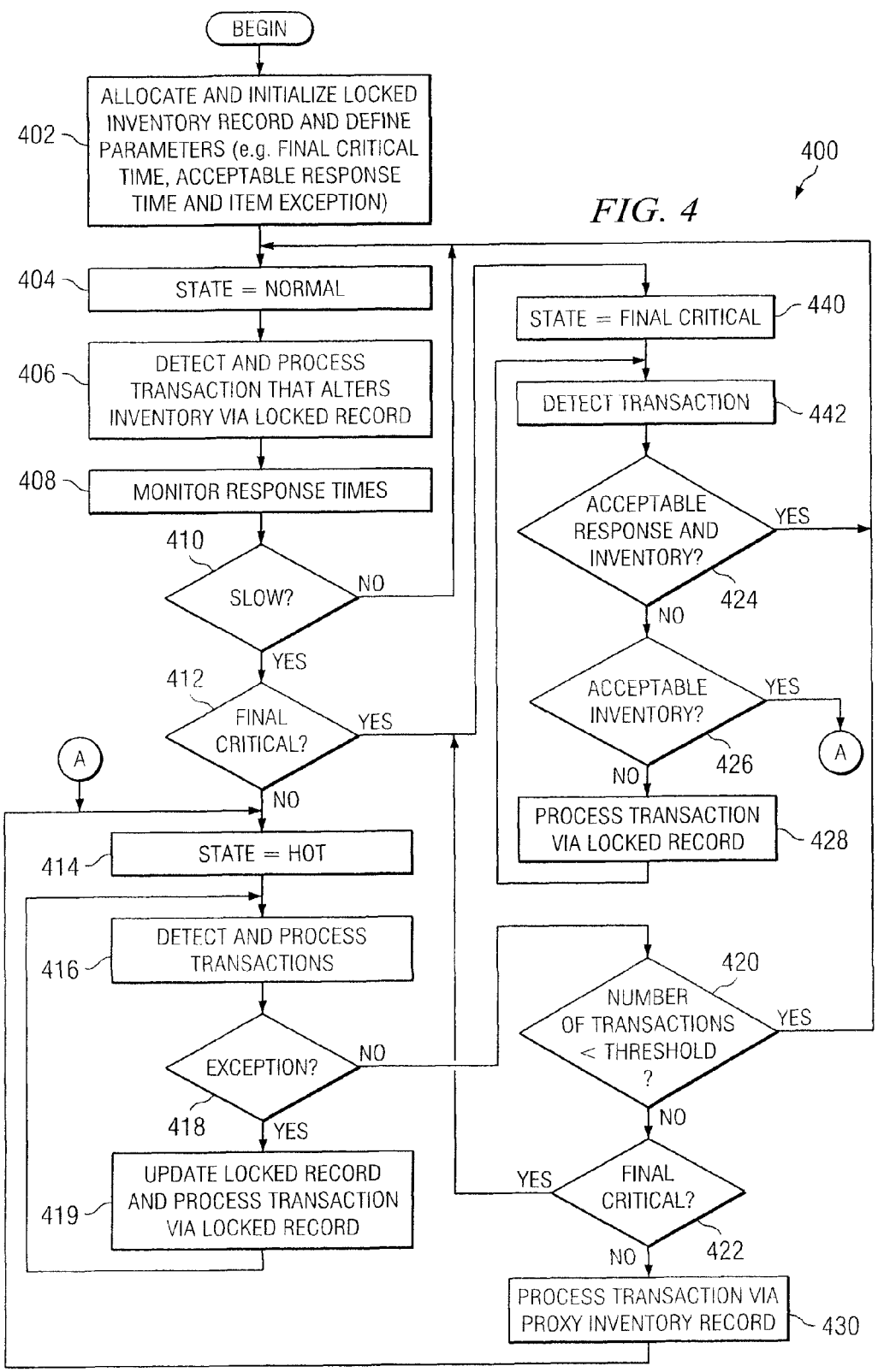
FIG. 4 is a flow diagram illustrating an embodiment of a method of processing transactions.

Turning now to FIG. 4, a flow diagram illustrates one specific implementation of a transaction processing method 400. As depicted in FIG. 4, method 400 includes allocating and initializing (block 402) a locked inventory record such as inventory record 112 shown in FIG. 1. In addition, block 402 of method 400 as shown includes allocating and defining various variables and parameters for use in the transaction processing method. These defined parameters may include, as examples, a Final Critical time parameter, an Acceptable Response time parameter, and an Item Exception Factor parameter.

In block 404, method 400 sets a state variable to a value indicative of a normal inventory state. In the described implementation, the normal inventory state encompasses an inventory state in which inventory levels are sufficient to maintain inventory for a desired length of time and demand or transaction volume is not so excessive that unacceptable response times result. In the normal inventory state, method 400 includes detecting and processing transactions (block 406) via the locked inventory record 112. The transactions that are processed are generally transactions that alter the inventory level of the applicable item of inventory. These transactions may include purchase transactions that reduce the level of inventory as well as stocking transactions that increase the level of inventory.

In block 408, the depicted embodiment of method 400 is shown monitoring the response times associated with the transactions and, especially the transactions representing requests by customers and other transaction clients 102 (FIG. 1) that reduce the inventory. Monitoring of response times may be achieved by measuring the time that elapses between receipt of a transaction request by transaction server 120 and the unlocking or releasing of inventory record 112 after the transaction has been processed. The response time may be used to estimate the total latency perceived by the transaction client 102. The total latency may include, in addition to response time delays associated with queued requests to access inventory lock 112, any latency associated with network 105 including any network equipment at the client end. Although these latency factors may not be precisely determinable by transaction server 102, transaction server 102 may take account of the inevitable network latency when determining a level of response time that is acceptable.

In block 410 as shown in FIG. 4, method 400 includes determining if the monitored response time is slow or otherwise exceeds a specified threshold. The response time may represent an average response time for a number of recent requests. In other embodiments, the response time that is compared to the threshold may be the worst case response time of a number of recent transaction requests. In still other embodiments, the response time that is compared against the threshold may be determined statistically based on all or a selected portion of recent or historical transaction requests. Whereas using the worst case response time to determine Hot SKU status may produce the lowest overall occurrence of unacceptable response times, it may also result in overly frequent resort to transaction processing through proxy inventory record 122. The response time value that is compared against the threshold is preferably optimized for the environment and application to reduce slow response times without abandoning locked record processing prematurely.

If the monitored response is not too slow as determined in block 410, processing returns to block 406, i.e., normal inventory processing. If, however, the detected response time does exceed the threshold, method 400 as shown proceeds to block 412 where a final critical check is performed (block 412). The final critical check calculates an estimate of the time-to-zero-inventory based on current inventory levels and transaction volume and compares the estimate to a predetermined threshold represented by Final Critical time parameter 217 as shown in FIG. 2. If the inventory is at a critical level, i.e., the time to zero inventory is less than the specified threshold, method 400 jumps to final critical processing at block 440. If, on the other hand, the inventory level is sufficient, method 400 sets (block 414) the inventory status variable to a value indicative of the Hot SKU status.

In the Hot SKU status, method 400 as shown includes detecting and processing transactions (block 416). As part detecting transactions in block 416, method 400 may include maintaining statistics or other information about the detected transactions. As an example, detecting transactions in block 416 might include maintaining information that is indicative of the number of transactions occurring on a per period basis. This information could be maintained, for example, based on the number of requests to read the inventory record per period. Thus, method 400 and detecting block 416 may include maintaining a moving average of the number of requests to read the inventory record per a given period. In other embodiments, detecting transactions in block 416 might include maintaining other information, for example, maintaining data indicative of the average response time or other information of interest.

When a transaction is detected in the Hot SKU inventory state, method 400 as shown includes determining (block 418) whether a particular transaction raised an exception. As indicated previously, an exception might be raised when, for example, the number of items associated with a received order exceeds or substantially exceeds the number of items associated with an "average" order. Method 400 may also define other exceptions. When an exception is detected, however, the transaction is processed (block 419) via the locked inventory record 112. In the context of a Hot SKU inventory item, the processing represented by block 420 would include obtaining the lock for inventory record 112, updating inventory record 112 with the latest value of proxy inventory record 122, processing the transaction that raised the exception including modifying the inventory record 112 to reflect the exception producing transaction, unlocking or releasing the inventory record 112, and setting the inventory record 122 with the latest value of inventory record 112. Exception processing might also occur in a Hot SKU inventory state when a stocking transaction that increase the level of inventory is detected.

If no exception is detected in block 418, method 400 as shown determines (block 420) whether a return to normal status has occurred. In the depicted embodiment, this determination is made by comparing the number of requests to read the inventory record, on a per period basis, for the applicable good or item of inventory. The number of requests to read inventory per period is directly proportional to the number of orders. If the number of requests to read the inventory record is below a threshold limit, method 400 jumps to block 404 where the transaction processing state is returned to "normal". The threshold limit may be a constant value that is determined beforehand or a dynamic value determine based on evaluation of various suitable parameters. In this embodiment, the criteria to exit the Hot SKU state, i.e., read requests per period, is different than the criteria to enter the Hot SKU state, i.e., response times. In other embodiments that are not depicted explicitly, a transition from the Hot SKU state to the normal state might be based on the same criteria as the criteria that caused the transition to the Hot SKU state initially. For example, transition to and from Hot SKU state might be based on response times.

If the number of read requests remains above the threshold, the Hot SKU state persists and method 400 proceeds to block 422 where a final critical determination is made by estimation the time to zero inventory as was done in block 412. If the inventory level is critical, method 400 jumps to final critical processing in block 440. If, however, the inventory level for the Hot SKU is not critical, method 400 performs the Hot SKU transaction processing in block 430. Transaction processing in block 430 includes modifying the proxy inventory record 122.

If the inventory record is determined to be critical in block 412 or 422, method 400 as shown jumps to the final critical processing in block 440, where the inventory status variable is set to a value indicate of a Final Critical inventory state. In the Final Critical state, transactions are detected in block 442. In the depicted embodiment, a determination is made (block 424) regarding whether the response time is now acceptable and the inventory levels are now sufficient to change the inventory status to normal. If either of those conditions is untrue, method 400 may still transition to the Hot SKU inventory status if (block 426) the inventory levels are above the critical stage but the response times are still slow enough to justify Hot SKU processing. If the inventory level is still critical, critical processing occurs in block 428 where the transaction is processed via locked record 112.

In alternative embodiments, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal, so that a device connected to a network 105 can communicate voice, video or data over the network 105. Further, the instructions may be transmitted or received over the network 105 via the network interface device 220.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In accordance with various embodiments, the methods described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. The software may also utilize a signal containing computer instructions. A digital file attachment to e-mail or other self-contained information archive or set of archives is considered a distribution medium equivalent to a tangible storage medium. Accordingly, the disclosure is considered to include a tangible storage medium or distribution medium as listed herein, and other equivalents and successor media, in which the software implementations herein may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. .sctn. 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A computer implemented method of managing inventory, the method comprising:
    responsive to determining that a latency value indicative of a transaction latency associated with transactions involving an item is acceptable, updating, following a transaction involving the item, an inventory value indicative of a quantity of the item according to a first inventory update method wherein the first inventory update method alters a locked inventory record;
    responsive to determining that the inventory value is below an inventory threshold, updating the inventory value following the transaction according to the first inventory update method regardless of the transaction latency; and
    responsive to determining that the inventory value is not below the inventory threshold and that the latency value is unacceptable, updating the inventory value following the transaction according to a second inventory update method wherein the second inventory update method alters a proxy for the locked inventory record.

2. The method of claim 1, wherein determining that the latency value is acceptable includes determining that the latency value is less than a specified threshold.

3. The method of claim 1, wherein the first inventory update method includes acquiring a lock corresponding to the locked inventory record, modifying the record, and thereafter releasing the lock.

4. The method of claim 3, wherein altering the proxy for the locked inventory record does not include accessing a lock.

5. The method of claim 1, wherein the inventory threshold represents a level of inventory sufficient to meet demand for a predetermined critical duration.

6. The method of claim 1, further comprising, responsive to the transaction raising an exception, updating the inventory value according to the first inventory update method regardless of the inventory value.

7. A data processing system suitable for use in an inventory management environment, comprising:
    a processor having access to a computer readable medium, the computer readable medium including inventory management instructions, the inventory management instructions, executable by the processor, to:
        monitor transactions that alter inventory quantity of an item;
        determine a latency value indicative of a transaction latency associated with the transactions;
        responsive to determining that the latency value is acceptable, update an inventory value, indicative of a quantity of the item in inventory, according to a first inventory update method wherein the first inventory update method includes updating a locked record of the inventory value;
        responsive to determining that the inventory value is not below an inventory threshold and that the latency value is unacceptable, update the inventory value according to a second inventory update method wherein the second inventory update method includes updating a non-locked proxy of the inventory value; and
        responsive to determining that the inventory value is below the inventory threshold, update the inventory value according to the first inventory update method regardless of the latency value.

8. The system of claim 7, wherein the latency value indicates a worst case transaction latency for a set of recent transactions.

9. The system of claim 7, wherein the latency value represents an average transaction latency for a set of recent transactions.

10. The system of claim 7, wherein the inventory threshold represents a level of inventory sufficient to meet an expected demand for the item for a predetermined critical duration.

11. A non-transitory computer readable medium including computer executable program instructions for managing inventory updates, the program instructions including instructions to:
    determine a transaction response time associated with transactions for an item of inventory;
    determine a selected inventory update method from a first inventory update method and a second inventory update method based at least in part on the transaction response time;
    respond to detecting a level of inventory below a critical threshold by selecting the first inventory update method as the selected inventory update method regardless of the transaction response time; and
    respond to a particular transaction for the item of inventory by modifying an inventory record according to the selected inventory update method;
    wherein the first inventory update method includes updating a locked record of an inventory value indicative of a quantity of the item in inventory and wherein the second inventory update method includes updating a freely accessible proxy for the inventory value.

12. The computer readable medium of claim 11, wherein the instructions to determine the selected inventory update method include instructions to select the second inventory update method when the transaction response time is below a response threshold.

13. The computer readable medium of claim 11, wherein the first inventory update method includes acquiring a lock corresponding to the locked record of the inventory value, modifying the locked record, and thereafter releasing the releasing the locked record.

14. The computer readable medium of claim 11, wherein the critical threshold represents a level of inventory sufficient to meet demand for a predetermined critical duration.

15. The computer readable medium of claim 11, further comprising, program instructions to respond to a particular transaction raising an exception by selecting the first inventory update method regardless of the transaction response time.

16. The computer readable medium of claim 15, wherein the particular transaction raises the exception when a number of items associated with the particular transaction exceeds an expected number of items per transaction.

* * * * *